United States Patent
Pulkkinen et al.

(10) Patent No.: US 7,907,969 B2
(45) Date of Patent: Mar. 15, 2011

(54) RADIO TELECOMMUNICATIONS NETWORK MANAGEMENT

(75) Inventors: Heikki Pulkkinen, Lepsämä (FI); Miikka Huomo, Espoo (FI); Markku Viitasuo, Lahti (FI); Petri Jappila, Helsinki (FI)

(73) Assignee: Nokia Corporation, Espoo (FI)

( * ) Notice: Subject to any disclaimer, the term of this patent is extended or adjusted under 35 U.S.C. 154(b) by 1019 days.

(21) Appl. No.: 11/731,127

(22) Filed: Mar. 30, 2007

(65) Prior Publication Data

US 2008/0242302 A1 Oct. 2, 2008

(51) Int. Cl.
 H04M 1/00 (2006.01)
 H04B 1/38 (2006.01)
 H04W 4/00 (2009.01)
(52) U.S. Cl. ............ 455/560; 455/561; 455/435.1
(58) Field of Classification Search ........... 455/435.1, 455/560–561
 See application file for complete search history.

(56) References Cited

U.S. PATENT DOCUMENTS

| | | | |
|---|---|---|---|
| 2004/0017783 A1* | 1/2004 | Szentesi et al. | 370/256 |
| 2005/0026615 A1 | 2/2005 | Kim | 455/436 |
| 2006/0018294 A1 | 1/2006 | Kynaslahti et al. | 370/338 |
| 2006/0084445 A1* | 4/2006 | Minami et al. | 455/452.1 |
| 2007/0049308 A1 | 3/2007 | Lindoff et al. | 455/509 |
| 2008/0080428 A1* | 4/2008 | Jappila et al. | 370/331 |
| 2008/0137595 A1* | 6/2008 | Surazski et al. | 370/329 |
| 2008/0186862 A1* | 8/2008 | Corbett et al. | 370/237 |

FOREIGN PATENT DOCUMENTS

| | | |
|---|---|---|
| WO | WO 02-49381 A1 | 6/2002 |
| WO | WO 2004-095792 A1 | 11/2004 |
| WO | WO 2006-024308 A1 | 3/2006 |
| WO | WO 2006-114683 A2 | 11/2006 |

OTHER PUBLICATIONS

"Mobile Broadband: The Global Evolution of UMTS/HSPA 3GPP Release 7 and beyond," Jul. 13, 2006, pp. 1-63.
"Nokia HSPA—low cost, high performance," Nokia-Nokia HSPA solution and Nokia 1-HSPA, (Internet: www.nokia.com).
"3rd Generation Partnership Project; Technical Specification Group Core Network and Terminals; Mobile radio interface Layer 3 specification; Core network protocols; Stage 3 (Release 7)," Section 10.5.5.23, 3 pages, 3GPP TS 24.008 V7.7.0 (Mar. 2007).

* cited by examiner

*Primary Examiner* — Marivelisse Santiago-Cordero
(74) *Attorney, Agent, or Firm* — Harrington & Smith

(57) ABSTRACT

Management of a radio telecommunications network, in which a plurality of a radio network controllers (RNCs) are served with a gateway support node having a given configuration. An added RNC connected to the radio telecommunications network is detected and then it is detected the serving gateway support node if the added RNC is a flat radio access node. If the added RNC is detected as a flat radio access node, it is verified whether the configuration allows serving the added RNC and if yes, the added RNC is connected with the serving gateway support node and correspondingly the configuration is modified. Alternatively, if the added RNC is detected as not being a flat radio access node, connecting the added RNC with the serving gateway support node is refused.

41 Claims, 3 Drawing Sheets

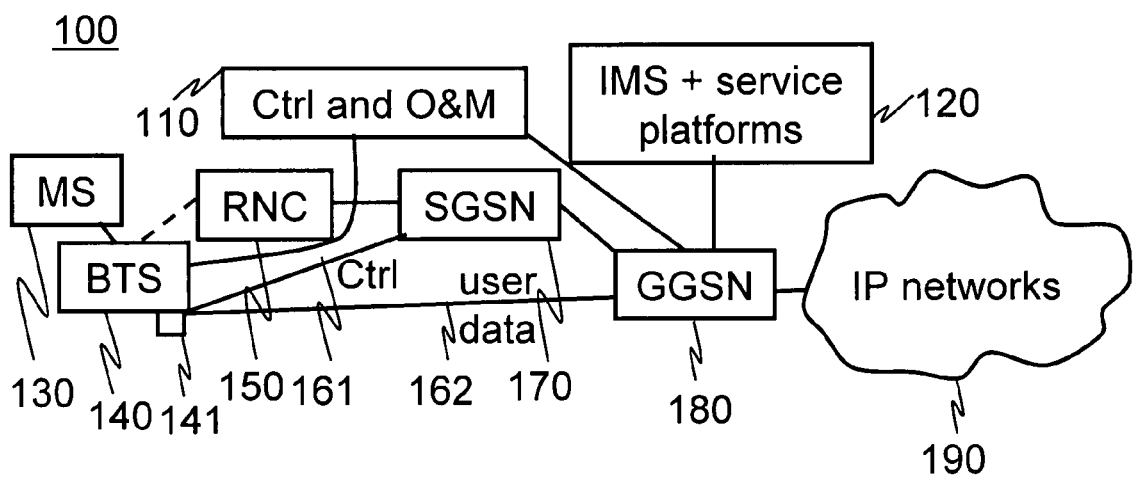

RADIO TELECOMMUNICATIONS NETWORK MANAGEMENT

FIELD OF THE INVENTION

The present invention generally relates to telecommunications network management. The invention relates particularly, though not exclusively, to access node management in telecommunications networks.

BACKGROUND OF THE INVENTION

There are various radio telecommunications networks co-existing and competing with varying services being offered and technologies being used. For mobile radio telecommunications, save perhaps satellite communications, it is typical that a moving mobile station makes handovers on its travel. In the handover, the mobile stations are switched to different base stations so that they can remain connected during the travel.

In GSM and W-CDMA, circuit switched and packet switched radio access are available to mobile terminals or mobile stations more generally. In the circuit switched access that is mostly used for speech communications, the call communication travels over radio interface between a mobile station and a serving Base Transceiver Station, over an Iub or Abis interface between the serving base station and network controller (named as Base Station Controller BSC or Radio Network Controller RNC in GSM and W-CDMA, respectively) and over an Iu interface between the controller and a Core Network (CN). In packet switched communications, the CN communicates with the RNC (or BSC) with a Serving Gateway Support Node (SGSN).

Normally, one controller controls a number of different base stations, but in particular new technologies such as HSPA (High Speed Packet Access) a singular base stations are managed by dedicated controllers. That a base station or generally access point connects directly to an SGSN or a server interconnecting to the Internet can be referred to a flat radio architecture. In high-speed packet data transfer a flat radio node-B (base transceiver station) provides some advantages such as faster retransmissions. Flat radio node-B refers to a node-B that is adapted to directly communicate with a packet data network (e.g. Internet) entity. HSPA is known, for example, from US 2006/0018294A1 filed on 29 Jun. 2005, assigned to Nokia Corporation and hereby incorporated by reference. Generally, HSPA or also so-called I-HSPA (Internet High Speed Packet Access) is a pre-step towards 3GGP Long Term Evolution (SAE/LTE/release 8). I-HSPA uses LTE architecture with a release 5 or 6 radio interface to ensure a broad user base. It is assumed that I-HSPA is packet only solution and when CS services are needed BTS handovers UE to CS capable BTS.

I-HSPA can be used with a standard Rel5 SGSN, but it is assumed that system performs better if at least the SGSN is One Tunnel capable (1T was actually Nokia proprietary feature that is now standardized in 3GPP). Furthermore I-HSPA may be optimized further over the one tunnel solution. Mobile Broadband: The Global Evolution of UMTS/HSPA 3GPP Release 7 and Beyond (www.3gamericas.org/English/pdfs/wp_UMTS_Rel7_Beyond_FINAL.pdf) describes in chapter 4.3 the one tunnel or direct tunnel using which more scalable UMTS system architecture can be achieved by direct tunneling of user plane data between the RNC and the GGSN. In the one tunnel approach, the transport and control functionality of the SGSN are separated, resulting in a new distribution of functionality with the GGSN. The new SGSN controller (cSGSN) is performing all control functions of an SGSN while the enhanced GGSN (xGGSN) is responsible for SGSN and GGSN transport functionality for the majority of traffic.

In the I-HSPA or in flat radio in general, the mobility management in the network is challenging as every time when a mobile station is handed over from one BTS to another, the RNC also changes and related mobility management operations are needed. Further, paging and location updates add signaling the more the fewer base stations are associated with individual RNCs. This further adds processing load to the serving gateway support node. Smaller routing areas result in less signaling on paging but increased handovers from one node-B to another.

In HSPA, if a node B is enabled to operate as a radio network controller (RNC), the RNC is seen by associated SGSN in a same way as a normal RNC that controls a multitude of BTS's. Hence, to ensure continuous operation, each SGSN in an HSPA enabled telecommunications network has to be dimensioned to have sufficient capacity to survive excessive mobility management that follows if all the connected RNCs are actually HSPA node Bs. Conversely, some of the SGSNs are over-dimensioned with regard to the actual need.

SUMMARY

According to a first aspect of the invention there is provided a method for managing a radio telecommunications network, comprising:
  serving a plurality of a radio network controllers (RNCs) with a gateway support node having a given configuration, each RNC controlling one or more base transceiver stations;
  detecting an added RNC that is connected to the radio telecommunications network;
  detecting by the serving gateway support node the number of base transceiver stations controlled by the added RNC; and
  if said number meets a predetermined limit, verifying whether the configuration allows serving the added RNC and:
    if yes, connecting the added RNC with the serving gateway support node and correspondingly modifying the configuration; and
    if no, refusing to connect the added RNC with the serving gateway support node.

The predetermined limit may be a maximum of one base transceiver station. A situation in which an added RNC controls only one base transceiver station corresponds to the added RNC being a flat radio node.

The added RNC may be the last RNC added to the telecommunications network. Alternatively, the added RNC may be installed at the same time or before other RNCs in the telecommunication network.

Advantageously, on adding a new RNC into the telecommunications network, it may be detected whether an associated serving gateway support node can serve the added RNC and correspondingly either connect the RNC with the support node or not. Thus, error resilience in management of the telecommunications network may be enhanced by restricting erroneous configuring of the network.

The verifying whether the configuration allows serving the added RNC may depend on the data transmission capabilities of the added RNC. The added RNC may be an Internet High Speed Packet Access (I-HSPA) enabled RNC.

The given configuration of the serving gateway support node may define any of: maximum number of connected RNCs, maximum number of flat radio access node RNCs, total resources of the serving gateway support node and estimates for resource requirements associated with different types of RNCs, and any combination of thereof.

The method may further comprise enabling nodes to negotiate capabilities used between neighboring nodes and to maintain information identifying the negotiated capabilities. Advantageously, by negotiating capabilities between neighboring nodes may reduce signaling between RNCs and serving gateway support nodes.

The added RNC may be configured to form a direct tunnel that by-passes the serving gateway support node for user data transfer. The serving gateway support node may detect that the added RNC is capable of the direct tunnel technology and responsively account for the correspondingly reduced capacity requirement for the verifying whether the configuration allows serving of the added RNC.

The method may further comprise negotiating between the added RNC and other RNCs capabilities and neighboring RNCs permitting, performing mobility related tasks directly between two or more RNCs.

The configuration of the serving gateway support node may be stored in a configuration table. The configuration table may define any of the following criterion or criteria: estimated resource demand associated with different types of node-Bs; estimated or measured resources of the SGSN 170; estimated or measured free resources of the SGSN 170; licensed number of various types of network entities such as node-Bs; remaining licensed number of various types of network entities that are allowed to be connected to the core network; and Quality of Service (QoS) related data defining QoS capabilities and/or requirements.

The method may further comprise providing the serving gateway support node with information that the added RNC is a flat radio access node. The information may be provided in a particular information element added into signaling between the RNC and the serving gateway support node or by using a particular data field value such as Iu reset cause code.

The serving gateway support node may deduce that the added RNC is a flat radio access node may be based on signaling cause by the added RNC and/or mobile stations entering and exiting a cell covered by the RNC.

The serving gateway support node may be configured to vary charging applied to a mobile station that communicates via a given RNC according to whether the communication via the given RNC uses flat radio or not.

According to a second aspect of the invention there is provided a high-speed packed adapter configured to enable a base transceiver station as a radio network controller (RNC), comprising:
  an interface configured to communicate with a gateway support node having a given configuration and to inform to the support node that the RNC represented by the adapter controls one base transceiver station; wherein
  the adapter is configured to verify from the support node whether the configuration allows serving the RNC; and:
    if yes, the interface is further configured to connect to the serving gateway support node and correspondingly causing the support node to modify the configuration;
    if no, the interface is further configured to abstain from connecting to the serving gateway support node.

According to a third aspect of the invention there is provided a method in a high-speed packed adapter configured to enable a base transceiver station as a radio network controller (RNC), comprising:
  communicating with a gateway support node having a given configuration;
  informing to the support node that the RNC represented by the adapter controls one base transceiver station; and
  verifying from the support node whether the configuration allows serving the RNC; and:
    if yes, connecting to the serving gateway support node and correspondingly causing the support node to modify the configuration; and
    if no, abstaining from connecting to the serving gateway support node.

The given configuration of the serving gateway support node may define any of: maximum number of connected RNCs, maximum number of flat radio access node RNCs, total resources of the serving gateway support node and estimates for resource requirements associated with different types of RNCs, and any combination of thereof.

The method may further comprise enabling nodes to negotiate capabilities used between neighboring nodes and to maintain information identifying the negotiated capabilities. Advantageously, by negotiating capabilities between neighboring nodes may reduce signaling between RNCs and serving gateway support nodes.

The RNC may be an Internet High Speed Packet Access (I-HSPA) enabled RNC.

The RNC may be configured to form a direct tunnel that by-passes the serving gateway support node for user data transfer. The serving gateway support node may detect that the added RNC is capable of the direct tunnel technology and responsively account for the correspondingly reduced capacity requirement for the verifying whether the configuration allows serving of the added RNC.

The method may further comprise negotiating between the RNC and other RNCs capabilities and neighboring RNCs permitting, performing mobility related tasks directly between two or more RNCs.

The configuration of the serving gateway support node is advantageously stored in a configuration table. The configuration table may define any of the following criteria: estimated resource demand associated with different types of node-Bs; estimated or measured resources of the SGSN; estimated or measured free resources of the SGSN; licensed number of various types of network entities such as node-Bs; remaining licensed number of various types of network entities that are allowed to be connected to the core network; and Quality of Service (QoS) related data defining QoS capabilities and/or requirements.

The RNC may be configured to provide information to the serving gateway support node that the RNC is a flat radio access node. The information may be provided in a particular information element added into signaling between the RNC and the serving gateway support node or by using a particular data field value such as Iu reset cause code.

The serving gateway support node may be configured to detect that the RNC is a flat radio access node based on the signaling caused by the added RNC and/or mobile stations entering and exiting a cell covered by the RNC.

The serving gateway support node may be configured to vary charging applied to a mobile station that communicates via a given RNC according to whether the communication via the given RNC uses flat radio or not.

According to a fourth aspect of the invention there is provided a serving gateway support node for managing a radio telecommunications network, the support node having a given configuration and comprising:
  a configuration table maintaining configuration of the support node;

an interface configured to serve a plurality of a radio network controllers (RNCs), each RNC controlling one or more base transceiver stations; and a processor for detecting an added RNC that is connected to the radio telecommunications network and for detecting the number of base transceiver stations controlled by the added RNC; wherein the processor is further configured to verify whether the configuration allows serving the added RNC if said number meets a predetermined limit, and:

if yes, to connect the added RNC with the serving gateway support node and the processor is configured to correspondingly modifying the configuration; and if no, to refuse to connect the added RNC with the serving gateway support node.

According to a fifth aspect of the invention there is provided a method in a serving gateway support node having a given configuration for managing a radio telecommunications network, comprising:

serving a plurality of a radio network controllers (RNCs), each RNC controlling one or more base transceiver stations;

detecting an added RNC that is connected to the radio telecommunications network;

detecting by the serving gateway support node the number of base transceiver stations controlled by the added RNC; and if said number meets a predetermined limit, verifying whether the configuration allows serving the added RNC and:

if yes, connecting the added RNC with the serving gateway support node and correspondingly modifying the configuration; and if no, refusing to connect the added RNC with the serving gateway support node.

According to a sixth aspect of the invention there is provided a system for managing a radio telecommunications network, comprising:

a serving gateway support node having a given configuration for serving a plurality of a radio network controllers (RNCs), each RNC controlling one or more base transceiver stations, the serving gateway support node being configured to detect an added RNC that is connected to the radio telecommunications network and to detect the number of base transceiver stations controlled by the added RNC;

a plurality of RNCs including an added RNC to be configured to the support node; wherein if said number meets a predetermined limit, the support node is configured to verify whether the configuration allows serving the added RNC and:

if yes, the support node is configured to connect the added RNC with the serving gateway support node and to correspondingly modify the configuration; and if no, the support node is configured to refuse to connect the added RNC with the serving gateway support node.

According to a seventh aspect of the invention there is provided a computer program for controlling a high speed packet data adapter, comprising computer executable program code for causing the adapter to implement the method of the third aspect of the invention.

According to an eight aspect of the invention there is provided a computer program for controlling a serving gateway support node, comprising computer executable program code for causing the serving gateway support node to implement the method of the fifth aspect of the invention.

According to a ninth aspect of the invention, there is provided a memory medium carrying the computer program according to the seventh aspect of the invention.

According to a tenth aspect of the invention, there is provided a memory medium carrying the computer program according to the eighth aspect of the invention.

According to an eleventh aspect of the invention, there is provided a serving gateway support node for managing a radio telecommunications network, the support node having a given configuration and comprising:

a configuration table means for maintaining configuration of the support node;

an interface means for configured to serve a plurality of a radio network controllers (RNCs), each RNC controlling one or more base transceiver stations; and a processor means for detecting an added RNC that is connected to the radio telecommunications network and for detecting the number of base transceiver stations controlled by the added RNC; wherein the processor means is further configured to verify whether the configuration allows serving the added RNC if said number meets a predetermined limit, and:

if yes, to connect the added RNC with the serving gateway support node and the processor means is configured to correspondingly modifying the configuration; and if no, to refuse to connect the added RNC with the serving gateway support node.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which:

FIG. 1 shows a schematic picture of a system according to an embodiment of the invention;

FIG. 2 shows a block diagram of a server according to an embodiment of the invention;

DETAILED DESCRIPTION

Figure 3:
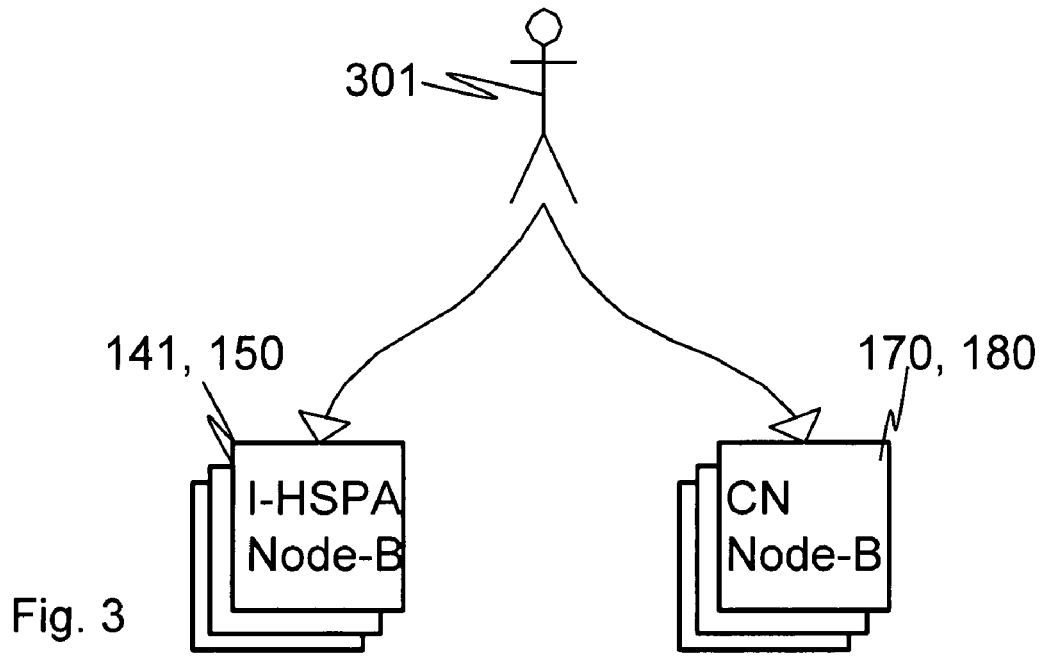
FIG. 3 shows an example of configuring different nodes.

In the following description, like numbers denote like elements.

FIG. 1 shows a schematic picture of a system 100 according to an embodiment of the invention. The picture is based on http://www.nokia.com/NOKIA_COM_1/Operators/Downloads/Nokia_Radio_Access_Networks/Nokia%20HSPA%20Solution.pdf that illustrates I-HSPA in conjunction with the one tunnel or direct tunnel solution.

The system 100 comprises a centralized control and operations and maintenance (O&M) function 110, an Internet Protocol (IP) Multimedia system (IMS) and service platforms function 120, a Mobile Station (MS) 130, a Base Transceiver Station (BTS) 140, an I-HSPA adapter 141 incorporated into the BTS 140, a Radio Network Controller (RNC) 150, a Serving Gateway Support Node (SGSN) 170, a Gateway GPRS Support Node (GGSN) 180 and a set of IP networks 190. The adapter 141 is in communicational connection 161 with the SGSN 170 for control and with the GGSN 180 for direct communication of user data. FIG. 1 illustrates how a BTS serving a packet data MS 130 is connected for control to an RNC 150 that further is connected to the SGSN and thereby to the GGSN. In effect, the BTS (or adapter 131 to be more accurate) is configured to operate in the direct tunnel (DT) mode for direct user data transfer between the GGSN 180 and the I-HSPA adapter 141. The operation by using the DT improves performance of the core network by reducing communication legs and thereby typically reducing communication delays and processing load in the core network. The DT decision may also be made during Packet Data Protocol (PDP) context activation procedure e.g. depending on the service characteristics or operator preferences or e.g. used Access Point Name (APN). The operation of the adapter is normally controlled by the GGSN via the connection through the SGSN 170 and the adapter 141.

It should be appreciated that FIG. 1 is illustrative only and that various components thereof may be omitted, replaced or further features be present in different embodiments. For circuit switched calls, for instance, it is useful to provide a common RNC 150 for serving a number of BTSs whilst for high-speed data such as I-HSPA, the RNC 150 may be effectively by-passed using an RNC adapter incorporated to the BTS 140. In an embodiment of the invention, a single BTS may also operate with the adapter 141 as part of an I-HSPA enabled node-B and as a normal BTS for the RNC 150.

FIG. 2 shows a block diagram of a server 200 according to an embodiment of the invention. The block diagram is intended to illustrate basic operation of any of the network entities (save the IP networks that are typically more diverse).

The server 200 comprises a communications block 210, a memory 220 containing a work memory 221, a non-volatile memory 222 comprising operating instructions 223, a processor 230 for executing the operating instructions and accordingly controlling other blocks of the user terminal, an administration interface 250 for providing local and/or remote administration of the server 200 and radio interface unit 260 for communicating with mobile stations 130 plus an I-HSPA adapter 141 (in case the server 200 represents the BTS 140 that is a flat radio node-B). The server 200 further comprises an input/output port 270 for communication with other network entities. It is recalled from the background art description that the flat radio in connection with node-B generally refers to a unit that is capable of acting as both a base station and base station controller for at least some mobile telecommunications aspects.

The processor is typically a master control unit MCU. Alternatively, the processor may be a microprocessor, a digital signal processor or an application specific integrated circuit. The server may be adapted to operate in a Wide-Band CDMA, CDMA2000 or any other cellular packet data enabled telecommunications network or core network more specifically (when not referring to the BTS or RNC). The processor 230 is typically a master control unit MCU. Alternatively, the processor 230 may be a microprocessor, a digital signal processor, an application specific integrated circuit, a field programmable gate array, a microcontroller or a combination of such elements.

FIG. 3 shows an example of configuring different nodes. A maintenance operator 301 configures to each node (Node-B, SGSN and GGSN) the capabilities of its peer nodes. A local or centralized O&M system may be used to configure the interface and capabilities of neighboring nodes. By configuring the capabilities of neighboring nodes to different nodes interoperation between the nodes is enabled. In case of node-B interoperation, the signaling on the Iu interface between the node Bs and the SGSN is reduced as the nodes take some responsibility in case of relocation, for instance.

Figure 4:
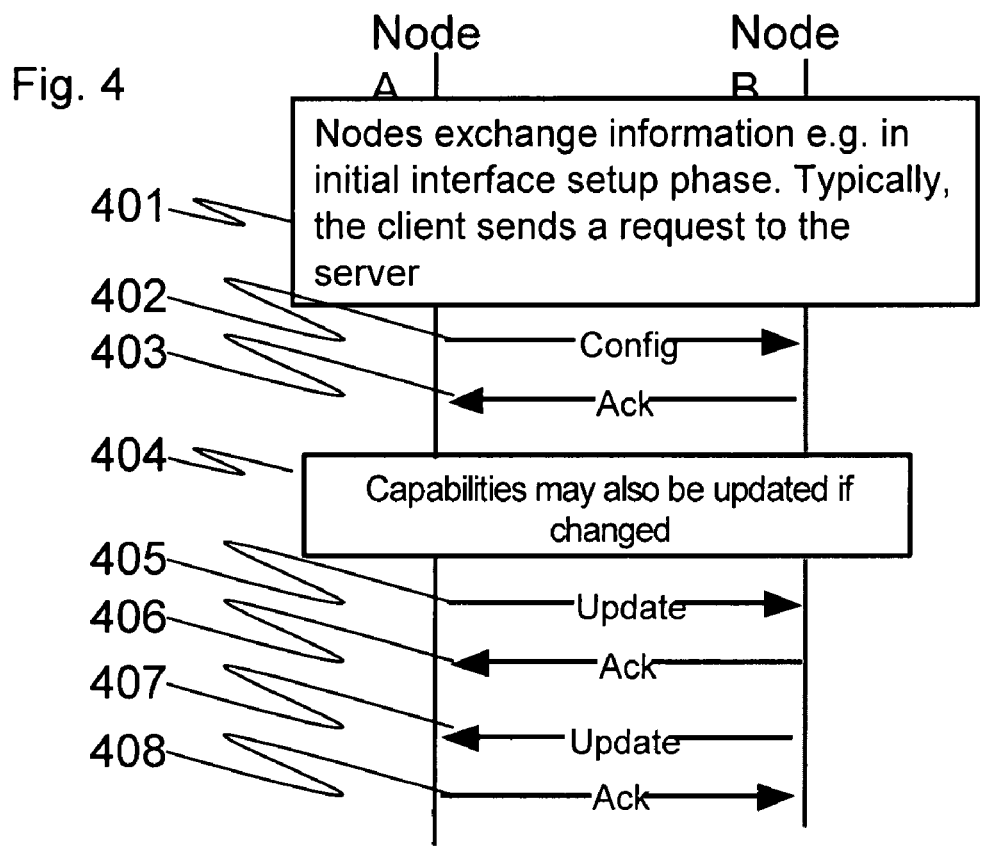
FIG. 4 shows an example on inter-node signaling for exchanging Radio Access Network (RAN)/Core Network (CN) capabilities.

FIG. 4 shows an example on inter-node signaling for exchanging Radio Access Network (RAN)/Core Network (CN) capabilities. By exchanging capability data at Node-B level, neighboring cells learn about each other's ability to negotiate relocation and optionally other procedures without relaying the signaling or at least some of associated signaling via the SGSN 170. Similarly, SGSNs or GGSNs may exchange information. In the following, capability exchange between two adjacent node-Bs is illustrated.

The capability exchange begins from situation 401 in which two nodes need to exchange information. This exchange typically occurs on initial interface setup, for instance when a node is installed or started. Typically, the nodes are capable of acting as a server or at least another node has such a capacity and the other node acts as a client. The client may then start the information exchange by sending a request Config 402 to the server. The client sends back an acknowledgement message Ack 403. The ack message 403 carries capability information adapted to configure the client to use the capabilities of the server in at least one mutual process such as relocation of a mobile station.

After the initial information exchange or instead of the initial information exchange, capabilities may also be updated during operation of the nodes. Such an exchange may occur particularly if the capabilities have changed to update the capabilities to a peer node as illustrated by block 404. Alternatively or additionally, an update may be carried out periodically. To update the capabilities exchanged between peer nodes, a first update message 405 is sent from one node to another. The first update message may contain current capabilities of the sender or changes to the capabilities of the sender and further additionally or alternatively a request for capability update. On receiving the first update message, a node replies by a first update acknowledgement Ack 406. Typically in addition to sending the first update acknowledgement, the node that received the first update message sends a second update message to the sender of the first update message. The second update message is typically similar to the first update message except that the second update message may indicate being a responsive or second update message so that the recipient of the second update message need not maintain state information to avoid sending ever again new responses. Responsive to the second update message, the recipient of the second update message (sender of the first update message) typically replies with a second acknowledgement message 408.

It should be appreciated that instead of carrying capability data in the first and second update messages, the update messages may be effectively requests for the capability data and then the capability data be carried in a response message that is either the following acknowledgement message or a separate response (not shown in FIG. 4).

Figure 5:
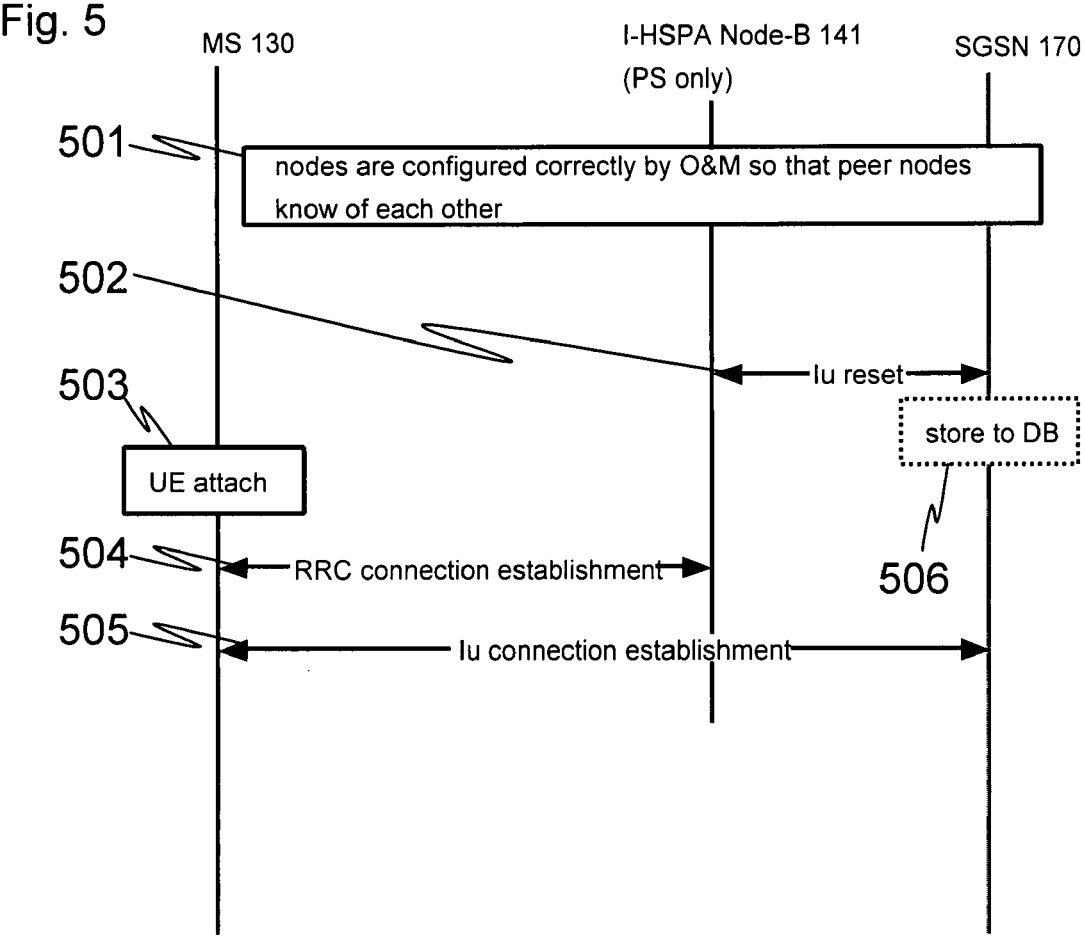
FIG. 5 shows a further example on capability exchange on Iu reset.

FIG. 5 shows a further example on capability exchange on Iu reset. In this example, the nodes are first correctly configured 501 by the Operation & Management function of the network such that the adapter 141 (that forms a packet switched only RNC or node B) knows of the SGSN 170 and vice versa. Next, the interface between the adapter 141 and the SGSN 170 is initialized. An Iu reset is carried out 502 between the adapter 141 and the SGSN 170 so that the capability of the adapter to operate as an I-HSPA node-B is informed to the SGSN 170. Resulting from the Iu reset and a capability information exchange in that connection (described in the following), the associated node-B and SGSN both advantageously know the capabilities of each other and in some embodiments also of their peers (e.g. if the process of FIG. 4 has been conducted). Once the Iu reset is ready, the node-B represented by the I-HSPA adapter 141 is ready for a user equipment or mobile station 130 to attach thereto Next, normal RRC connection establishment 504 follows with resulting Iu connection establishment between the MS 130 and the SGSN via the I-HSPA adapter 141 as know from the W-CDMA, for instance. As the SGSN and thereby core network is now aware that the node B used is an I-HSPA node, the CN may account for the resource demand (particularly mobility management) that is likely to follow from the connection.

During the Iu reset, the SGSN 170 may verify whether its configuration allows the registration of the node-B as a flat radio node such as an I-HSPA node-B. If not, the SGSN may reject the Iu reset or instruct the node-B to disable the flat radio operation, if the node-B supports such an option. The configuration of the SGSN is advantageously stored in a configuration table accessible to the SGSN 170, typically within the memory of the SGSN 170. The configuration table may define criteria such as: estimated resource demand associated with different types of node-Bs; estimated or measured resources of the SGSN 170; estimated or measured free resources of the SGSN 170; licensed number of various types of network entities such as node-Bs; remaining licensed number of various types of network entities that are allowed to be connected to the core network; and Quality of Service (QoS) related data defining QoS capabilities and/or requirements.

In different embodiments of the invention, the SGSN 170 identifies the I-HSPA BTS (140+141) either during configuration, dynamically or both. In an embodiment of the invention, the I-HSPA access nodes are detected while the network operator performs RNC configuration to the SGSN. At this time the available resources and/or the number of I-HSPA adapter licenses are checked in a further embodiment.

In an alternative embodiment the I-HSPA BTS 140 (with adapter 141) is automatically detected during interface establishment phase that occurs in Iu reset, for instance. FIG. 5 exemplifies this. The Iu reset may be invoked by a reset 502. On exchanging the capability information, on step 502 for instance, data is exchanged concerning capabilities of the BTS 140 and adapter 141 (as an RNC) such as the ability to act as an I-HSPA RNC. The data exchanged may be provided by a normal message in which a particular identifier is used to flag to the SGSN 170 that the BTS 140 is I-HSPA enabled, or the register message may be a particular message adapted for the purpose of conveying the capability data. For instance, a new information element (IE) may be implemented such that the structure of the IE is similar to 3GPP IE "MS network capability" or "MS radio access capability". The IE may contain capability information of an RNC (BTS 140 +adapter 141) or SGSN. The IE may deliver bi-directional capability information between the RNC and SGSN, or between two SGSNs or RNCs (peer capability information exchange). It is appreciated that using a capability IE allows building intelligent functionalities where the SGSN 170 or RNC (BTS 140+ adapter 141) does not start a procedure to inform the capabilities of the RNC to the SGSN if it is known that the peer network element lacks necessary support. By not starting to inform the capabilities in the absence of necessary support it is possible to reduce unnecessary signaling. In an example, the IE is added to Iu reset messages and the usage corresponds to the following: the element which starts reset procedure adds an own "capability IE" to the reset message and the receiving element adds its respective own "capability IE" to a reset acknowledge message. The capability information may also be constructed to Radio Access Network Application Part (RANAP) Information transfer message or a new message is used. Another alternative embodiment exchanges network capabilities using Network Feature Support IE (specified in 3GPP TS 24.008 section 10.5.5.23 to be included in attach/RAU accept messages). This would allow also the mobile to know if it has DTI, flat radio access capable network and can for example tune the MS on application layer accordingly. It is seen that typically the RNC does would not look into Layer 3 messaging so that the RNCs should be correspondingly adapted to find out the network capabilities from the Network Feature Support IE.

The carried information may include identification of support for any of the following items: Iur (an RNC-to-RNC) interface, Multimedia Broadcast Multicast Service (MBMS), Serving Mobile Location Centre (SMLC), I-HSPA, User Registration Area (URA) paging, High-Speed Downlink Packet Access (HSPDA), Radio Access Bearer (RAB) modify, International Mobile Subscriber Identity (IMSI) based Hand Over (HO), Multi Operator Radio Access Network (RAN), and Network Mode of Operation (NMO)-information or any functionality that the node may have in addition to standard functionality.

The SGSN 170 may maintain an RNC configuration table and store 506 (FIG. 5) an I-HSPA flag (in addition to other received information) to the RNC configuration table while the Iu reset is being carried out. Also advantageously the available resources and/or the number of allowed I-HSPA adapters may be checked.

In one advantageous embodiment, both the RNC marking during configuration and dynamic identification during Iu reset are enabled. Compared to a simple configuration alternative in which the RNC capabilities are checked only on reset, the dynamic identification during Iu reset enforces the detection and helps to identify if an I-HSPA enabled RNC were mis-identified as a normal RNC.

In the dynamic identification, the I-HSPA BTS identifies itself in the Iu reset. This identification may use a proprietary indicator or alternatively a specific reset cause for identifying I-HSPA support. The cause is selected so that normal RNC equipment will not use it in reset. If a cause such as network optimization (116) or alternatively a new proprietary IE (like described in the foregoing) is included in the reset request, the RNC is marked by the SGSN 170 as an I-HSPA enabled RNC.

Proprietary IE is a safer choice than using some reserved reset cause identifier as an explicit instruction that is not likely to be misinterpreted or needed by future standard use. If an SGSN needs to initiate Iu-reset, the SGSN may not itself use a reset cause identifier or a proprietary IE, but instead wait for a reset acknowledgement and read the proprietary IE therefrom.

SGSN shall decode the protocol using the information specified in RNC configuration. It may include e.g. the access type information so that rest of the system can know the access type. The information may also be delivered to a statistics and charging function. 3GPP Radio Access Technology (RAT) Type IE may be used to carry access type to the other network nodes. Note: SGSN should be configured as a Stream Control Transmission Protocol (SCTP) server. SGSN can be configured to stream Control Transmission Protocol (SCTP) client or server. In an embodiment the configuration is such that normally the RAN side initiates the reset procedure. This allows the SGSN to control the visibility of the feature indication. By this way the SGSN is also able to decide not to add the feature indication if the RAN does not support this functionality.

Using the knowledge of I-HSPA enabled RNCs, new counters are created in some embodiments of the invention and also access type information may be used in charging. For instance, an increased charging rate may be applied when the MS 130 is accessing the core network from a flat radio connection. Also the SGSN 170 may show to administration or gather statistics of the users accessing from flat radio.

It is appreciated in light of the foregoing description that different embodiments of the present invention provide various advantages. Aside of making the SGSN aware of I-HSPA adapters, it may be possible to control by the SGSN the amount of mobility events to be controlled and produce statistics reflecting accurate status of connected node-B elements. By using a particular readily available indication in signaling between the RNC and the SGSN, the interface between RNC and SGSN need not be changed. It is also seen relatively straightforward to implement an I-HSPA flag that an I-HSPA adapter adds Iu reset signaling, for instance so that an SGSN can identify the I-HSPA adapter based on the flag. The use of such a flag is also cost efficient i.e. invokes a very low computational cost on the RNC and SGSN. Further, as an SGSN is able to identify the I-HSPA adapter, the SGSN can count and limit the number of adapters, number of I-HSPA users or PDP contexts and also add I-HSPA access type information to all statistics, charging and external interfaces (such as Gn interface located between GPRS support nodes).

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method for managing a radio telecommunications network, comprising:
    serving a plurality of a radio network controllers (RNCs) with a gateway support node having a given configuration, each RNC controlling one or more base transceiver stations;
    detecting an added RNC that is connected to the radio telecommunications network;
    detecting by the serving gateway support node the number of base transceiver stations controlled by the added RNC; and
    when said number meets a predetermined limit, verifying whether the configuration allows serving the added RNC and:
    when said number meets the predetermined limit, and it is verified that the configuration allows serving the added RNC, connecting the added RNC with the serving gateway support node and correspondingly modifying the configuration; and
    when said number meets the predetermined limit, and it is verified that the configuration does not allow serving the added RNC, refusing to connect the added RNC with the serving gateway support node.

2. A method according to claim 1, wherein the predetermined limit is a maximum of one base transceiver station.

3. A method according to claim 1, wherein the given configuration of the serving gateway support node defines any of: maximum number of connected RNCs, maximum number of flat radio access node RNCs, total resources of the serving gateway support node and estimates for resource requirements associated with different types of RNCs, and any combination of thereof.

4. A method according to claim 1, wherein the verifying whether the configuration allows serving the added RNC depends on the data transmission capabilities of the added RNC.

5. A method according to claim 1, further comprising enabling nodes to negotiate capabilities used between neighboring nodes and to maintain information identifying the negotiated capabilities.

6. A method according to claim 1, wherein the added RNC is configured to form a direct tunnel that by-passes the serving gateway support node for user data transfer.

7. A method according to claim 6, wherein the serving gateway support node detects that the added RNC is capable of the direct tunnel technology and responsively accounts for the correspondingly reduced capacity requirement for the verifying whether the configuration allows serving of the added RNC.

8. A method according to claim 1 further comprising negotiating between the added RNC and other RNCs capabilities and neighboring RNCs permitting, performing mobility related tasks directly between two or more RNCs.

9. A method according to claim 1, wherein the configuration of the serving gateway support node is stored in a configuration table, wherein the configuration table defines any of the following criterion or criteria: estimated resource demand associated with different types of node-Bs; estimated or measured resources of the SGSN; estimated or measured free resources of the SGSN; licensed number of various types of network entities; remaining licensed number of various types of network entities that are allowed to be connected to the core network; and Quality of Service (QoS) related data defining QoS capabilities and/or requirements.

10. A method according to claim 1, further comprising providing the serving gateway support node with information that the added RNC is a flat radio access node.

11. A method according to claim 10, wherein the information is provided in a particular information element added into signaling between the RNC and the serving gateway support node or by using a particular data field value.

12. A method according to claim 10, wherein the serving gateway support node further deduces that the added RNC is a flat radio access node based on signaling caused by the added RNC and/or mobile stations entering and exiting a cell covered by the added RNC.

13. A method according to claim 1, wherein the serving gateway support node is configured to vary charging applied to a mobile station that communicates via a given RNC according to whether the communication via the given RNC uses flat radio or not.

14. A high-speed packed adapter configured to enable a base transceiver station as a radio network controller, comprising:
    a processor; and
    an interface configured to communicate with a gateway support node having a given configuration and to inform to the support node that the RNC represented by the adapter controls one base transceiver station; wherein
    the adapter is configured, with the processor, to verify from the support node whether the configuration allows serving the RNC; and:

when the adapter verifies from the support node that the configuration allows serving the RNC, the interface is further configured to connect to the serving gateway support node and correspondingly causing the support node to modify the configuration; and when the adapter verifies from the support node that the configuration does not allow serving the RNC, the interface is further configured to abstain from connecting to the serving gateway support node.

15. A high-speed packed adapter according to claim 14, wherein the given configuration of the serving gateway support node defines any of: maximum number of connected RNCs, maximum number of flat radio access node RNCs, total resources of the serving gateway support node and estimates for resource requirements associated with different types of RNCs, and any combination of thereof, and further configured to negotiate capabilities used between neighboring nodes and to maintain information identifying the negotiated capabilities.

16. A high-speed packed adapter according to claim 14, wherein the adapter is configured to support Internet High Speed Packet Access (I-HSPA).

17. A high-speed packed adapter according to claim 14, wherein the adapter is configured to form a direct tunnel that by-passes the serving gateway support node for user data transfer.

18. A high-speed packed adapter according to claim 14, further configured to negotiate with neighboring RNCs capabilities and to perform mobility related tasks directly with one or more neighboring RNCs subject to support of the neighboring RNCs.

19. A high-speed packed adapter according to claim 14, further configured to provide information to the serving gateway support node that the RNC is a flat radio access node.

20. A high-speed packed adapter according to claim 19, wherein the information is provided in a particular information element added into signaling between the RNC and the serving gateway support node or by using a particular data field value.

21. A method in a high-speed packed adapter configured to enable a base transceiver station as a radio network controller (RNC), comprising:

communicating with a gateway support node having a given configuration;

informing to the support node that the RNC represented by the adapter controls one base transceiver station; and verifying from the support node whether the configuration allows serving the RNC; and:

when it is verified from the support node that the configuration allows serving the RNC, connecting to the serving gateway support node and correspondingly causing the support node to modify the configuration; and when it is verified from the support node that the configuration does not allow serving the RNC, abstaining from connecting to the serving gateway support node.

22. A method according to claim 21, wherein the adapter operates using Internet High Speed Packet Access (I-HSPA).

23. A method according to claim 21, wherein the adapter forms a direct tunnel that by-passes the serving gateway support node for user data transfer.

24. A method according to claim 22, wherein the adapter forms a direct tunnel that by-passes the serving gateway support node for user data transfer.

25. A serving gateway support node for managing a radio telecommunications network, the support node having a given configuration and comprising:

a configuration table maintaining configuration of the support node;

an interface configured to serve a plurality of a radio network controllers (RNCs), each RNC controlling one or more base transceiver stations; and a processor for detecting an added RNC that is connected to the radio telecommunications network and for detecting the number of base transceiver stations controlled by the added RNC; wherein the processor is further configured to verify whether the configuration allows serving the added RNC if said number meets a predetermined limit, and:

when it is verified that the configuration allows serving the added RNC, the processor is further configured to connect the added RNC with the serving gateway support node and the processor is configured to correspondingly modifying the configuration; and when it is verified that the configuration does not allow serving the added RNC, the processor is further configured to refuse to connect the added RNC with the serving gateway support node.

26. A serving gateway support node according to claim 25, wherein the predetermined limit is a maximum of one base transceiver station.

27. A serving gateway support node according to claim 25, wherein the given configuration of the serving gateway support node defines any of: maximum number of connected RNCs, maximum number of flat radio access node RNCs, total resources of the serving gateway support node and estimates for resource requirements associated with different types of RNCs, and any combination of thereof.

28. A serving gateway support node according to claim 25, configured to form with the added RNC a direct tunnel that by-passes the serving gateway support node for user data transfer.

29. A serving gateway support node according to claim 25, configured to detect that the added RNC is capable of the direct tunnel technology and to responsively account for the correspondingly reduced capacity requirement for the verifying whether the configuration allows serving of the added RNC.

30. A serving gateway support node according to claim 29, further configured to enable the added RNC to communicate using Internet High Speed Packet Access (I-HSPA).

31. A serving gateway support node according to claim 25, configured to negotiate between the added RNC and other RNCs capabilities and neighboring RNCs permitting, performing mobility related tasks directly between two or more RNCs.

32. A serving gateway support node according to claim 25, wherein the configuration of the serving gateway support node is stored in a configuration table.

33. A serving gateway support node according to claim 32, wherein the configuration table defines any of the following criteria: estimated resource demand associated with different types of node-Bs; estimated or measured resources of the SGSN; estimated or measured free resources of the SGSN; licensed number of various types of network entities such as node-Bs; remaining licensed number of various types of network entities that are allowed to be connected to the core network; and Quality of Service (QoS) related data defining QoS capabilities and/or requirements.

34. A serving gateway support node according to claim 25, further configured to detect that an added RNC is a flat radio access node based on information provided by the RNC.

35. A serving gateway support node according to claim 34, further configured to receive the information in a particular information element added into signaling between the RNC and the serving gateway support node or from a particular data field value.

36. A serving gateway support node according to claim 25, further configured to vary charging applied to a mobile station that communicates via a given RNC according to whether the communication via the given RNC uses flat radio or not.

37. A method in a serving gateway support node having a given configuration for managing a radio telecommunications network in a serving gateway support node having a given configuration:
   serving a plurality of radio network controllers (RNCs), each RNC controlling one or more base transceiver stations;
   detecting an added RNC that is connected to the radio telecommunications network;
   detecting by the serving gateway support node the number of base transceiver stations controlled by the added RNC; and
   when said number meets a predetermined limit, verifying whether the configuration allows serving the added RNC and:
      when said number meets the predetermined limit, and it is verified that the configuration allows serving the added RNC, connecting the added RNC with the serving gateway support node and correspondingly modifying the configuration; and
      when said number meets the predetermined limit, and it is verified that the configuration does not allow serving the added RNC refusing to connect the added RNC with the serving gateway support node.

38. A system for managing a radio telecommunications network, comprising:
   a serving gateway support node having a given configuration for serving a plurality of a radio network controllers (RNCs), each RNC controlling one or more base transceiver stations, the serving gateway support node being configured to detect an added RNC that is connected to the radio telecommunications network and to detect the number of base transceiver stations controlled by the added RNC;
   a plurality of RNCs including an added RNC to be configured to the support node; wherein
   when said number meets a predetermined limit, the support node is configured to verify whether the configuration allows serving the added RNC and:
      when said number meets the predetermined limit, and it is verified that the configuration allows serving the added RNC, the support node is configured to connect the added RNC with the serving gateway support node and to correspondingly modify the configuration; and
      when said number meets the predetermined limit, and it is verified that the configuration does not allow serving the added RNC, the support node is configured to refuse to connect the added RNC with the serving gateway support node.

39. Stored in a non-transitory memory medium, a computer program for controlling a high speed packet data adapter configured to enable a base transceiver station to operate as a radio network controller (RNC), the computer program comprising computer executable program code that when executed causes the adapter to:
   communicate with a gateway support node having a given configuration;
   inform the gateway support node that the RNC represented by the adapter controls one base transceiver station; and
   verify from the support node whether the configuration allows serving the RNC; and:
      when it is verified that the configuration allows serving the RNC, connect to the serving gateway support node and correspondingly causing the support node to modify the configuration; and
      when it is verified that the configuration does not allow serving the RNC, abstain from connecting to the serving gateway support node.

40. Stored in a non-transitory memory medium, a computer program for controlling a serving gateway support node having a given configuration to manage a radio telecommunications network, comprising computer executable program code that when executed causes the serving gateway support node to:
   serve a plurality of a radio network controllers (RNCs), each RNC controlling one or more base transceiver stations;
   detect an added RNC that is connected to the radio telecommunications network;
   detect by the serving gateway support node the number of base transceiver stations controlled by the added RNC; and
   when said number meets a predetermined limit, verify whether the configuration allows serving the added RNC and:
      when it is verified that the configuration allows serving the added RNC, connect the added RNC with the serving gateway support node and correspondingly modifying the configuration; and
      when it is verified that the configuration does not allow serving the added RNC, refuse to connect the added RNC with the serving gateway support node.

41. A serving gateway support node for managing a radio telecommunications network, the support node having a given configuration and comprising:
   configuration table means for maintaining configuration of the support node;
   an interface means for configured to serve a plurality of a radio network controllers (RNCs), each RNC controlling one or more base transceiver stations; and
   processor means for detecting an added RNC that is connected to the radio telecommunications network and for detecting the number of base transceiver stations controlled by the added RNC; wherein
   the processor means is further configured to verify whether the configuration allows serving the added RNC when said number meets a predetermined limit, and:
      when it is verified that the configuration allows serving the added RNC, to connect the added RNC with the serving gateway support node and the processor means is configured to correspondingly modify the configuration; and
      when it is verified that the configuration does not allow serving the added RNC, to refuse to connect the added RNC with the serving gateway support node.

* * * * *